United States Patent Office 3,345,156
Patented Oct. 3, 1967

3,345,156
HIGH STRENGTH JOINED ARTICLE
George H. Eichelman, Jr., Cheshire, Conn., and Irwin Broverman, San Jose, Calif., assignors to Olin Mathieson Chemical Corporation, a corporation of Virginia
No Drawing. Original application May 25, 1965, Ser. No. 458,740, now Patent No. 3,290,182, dated Dec. 6, 1966. Divided and this application Aug. 5, 1966, Ser. No. 584,935
7 Claims. (Cl. 29—199)

ABSTRACT OF THE DISCLOSURE

The disclosure teaches novel brazed aluminum-bronze alloys having a tensile strength in exces of 100,000 p.s.i. and to the process for preparing same.

---

This application is a division of co-pending application Ser. No. 458,740, filed May 25, 1965, now U.S. Patent 3,290,182.

This application is a continuation-in-part of United States patent application Ser. No. 328,184, filed Dec. 5, 1963, now U.S. Patent 3,287,180, and United States patent application Ser. No. 341,121, filed Jan. 29, 1964, now U.S. Patent 3,297,497.

The present invention relates to a method for the preparation of a high strength brazed article and the article prepared thereby. More particularly the present invention resides in novel brazed copper base alloys, particularly aluminum bronze alloys, said brazed alloys having unusually high strength characteristics, and to the process for the preparation thereof.

For many uses it is necessary to join together copper base alloys and to provide high strength in the joined article. For example, in various heat exchangers and automotive radiators it is necessary to join the tubes to the tank and to provide a good joint or leakage will occur.

In addition, a wide variety of applications for copper base alloys require either the joining of one alloy to another or the joining together of two or more surfaces of a single copper base alloy. Examples of such uses include the making of component parts for heat exchange tanks and tubes and the making of flexible couplings. A specific example is the preparation of heat exchange tubes from copper strip. All of these applications require the joining together of copper base alloys to form joined articles having good physical properties, including good bond strength, without degrading the physical properties of the parent metal.

In automotive radiator applications, for example, it is conventional to join copper base alloys together by soldering, e.g., it is conventional to soft solder the copper tubes to the tank. This has been found to be unsatisfactory since the operating pressure and temperature of the radiator is limited by the strength of the soldered joint and the strength of the soldered joint is relatively weak. In addition, the surrounding heat-effected metal is weakened. Similarly soldering copper alloys together is of limited practicality in other applications where it is desired to form a high strength joint between copper alloys which will degrade under soldering conditions. For example, pressure and vacuum systems.

It is therefore highly desirable to form a high strength brazed copper article in order to increase the bond strength of the joint over that of soft solders. However, in order to braze copper base alloys they must be heated to temperatures on the order of 1000° F. and frequently higher than 1500° F. This cannot be done at present since the brazing procedure fully softens conventional copper base alloys. Furthermore, rehardening is impractical for brazed copper alloys.

It is therefore an object of the present invention to provide a process for joining copper base alloys and a joined article produced thereby.

It is an additional object of the present invention to provide a simple process for grazing together copper base alloys and the brazed article produced thereby, which attains physical properties heretofore unattained in articles of this type.

It is a particular object of the present invention to provide a process and article as aforesaid wherein the joint attains high strength values and wherein the parent metal in particular attains very high and in fact surprising strength values.

It is a further object of the present invention to provide a process and article as aforesaid which simply and conveniently overcomes the aforementioned shortcomings of the art and provides a greatly improved, high strength, brazed article.

Further objects and advantages of the present invention will appear hereinafter.

In accordance with the present invention it has now been found that the foregoing objects and advantages may be readily attained and an improved method of preparing a high strength joined article provided.

The present process comprises: (1) providing aluminum bronze alloy surfaces to be joined in the rolled condition, said alloy containing from 9.0 to 11.8 percent aluminum and the balance essentially copper; (2) applying a brazing flux and filler metal to the surfaces to be joined, said filler metal having a melting point above about 1049° F. and said brazing flux having a melting point lower than the filler metal; (3) forming an assembly by placing the surfaces to be joined with interposed brazing flux and filler metal into intimate contacting relationship; (4) heating said assembly to temperature above the melting point of the filler metal but below the melting point of said aluminum bronze alloy; and (5) cooling the assembly.

The high strength joined article of the present invention comprises at least two faying surfaces of aluminum bronze alloys containing from 9.0 to 11.8 percent aluminum and the balance essentially copper, said alloys having a metallographic structure containing from 5 to 95 percent beta phase and the remainder alpha phase and having uniformly fine metallographic grain structure with a grain size less than 0.065 mm., said faying surfaces being joined together by filler metal having a melting point lower than the aluminum bronze alloys.

The joined article of the present invention is characterized by exceptionally high strength, with the strength of the joint generally exceeding the strength of the parent metal. For example, the tensile strength of a joined article of the present invention (copper base alloys containing 9.8 percent aluminum) was found to be in excess of 100,-000 p.s.i., which is the strength of the parent metal, where the faying surfaces each had a gage of 0.040 inch, the filler metal was a copper base alloy containing 7 percent phosphorus, the brazing temperature was 1500° F. and the overlap at the joint was 9/32 of an inch. In this case, as is the case generally, the parent metal failed before the joint failed, i.e., the only limitation on the strength of the joint is the strength of the parent metal. In addition, the joined alloys had a uniformly fine metallographic grain structure with a grain size less than 0.065 mm. in diameter and contained a proportion of alpha to beta phase within the range of the present invention.

The high strength of the joined copper article of the present invention is particularly suprising. Conventionally one cannot attain strength levels even close to 100,000 p.s.i. since the base metal itself is not that strong, and even if it were initially, the high temperature brazing operation would weaken the alloys. The process of the present invention, however, quite surprisingly, actually improves the strength of the parent metal. For example, the copper base allow cotaining 9.8 percent aluminum described above has an annealed strength of about 85,000 p.s.i.; whereas after brazing as shown above the strength was increased to over 100,000 p.s.i. On the other hand, commercial 70-30 brass in its hardest condition has a tensile strength of 100,000 p.s.i. After brazing at a temperature of 1350° F. under the same conditions as above except that the brazing temperature was lower, the tensile strength of the joint was 42,000 p.s.i. and the parent metal failed before the joint. In addition, the metallographic grain structure had a grain size of about 0.3 mm.

A particularly surprising and advantageous feature of the present invention is that the brazing operation does not degrade the grain size of the parent metal. Normally the high temperature brazing operation causes grain growth in the area of the braze, accompanied by a loss of desirable physical characteristics. In accordance with the present invention, however, the fine grain size less than 0.065 mm. is retained after the high temperature brazing operation.

An additional disadvantage of conventional brazing operations is that under normal conditions the brazing is likely to cause extensive interdiffusion of filler metal into the parent metal, especially at the grain boundaries. This might and frequently does cause embrittlement by the formation of gross intermetallic compounds. In accordance with the present invention, however, there is limited penetration of filler metal into parent metal, generally less than one grain diameter, i.e., less than 0.065 mm. This is a significant advantage since it avoids the embrittlement problem caused by the formation of gross intermetallic compounds.

The aluminum bronze alloys to which the present invention relates may be either binary aluminum copper alloys having the aforesaid composition or may contain in addition from 0.05 to 5.0 percent of at least one additional element having a solid solubility in copper of less than 4.0 percent and which forms at least one intermetallic compound with aluminum. The total quantity of the additional elements being added must be less than 10.0 percent and preferably less than 5.0 percent. The preferred additional elements are selected from the group consisting of the following elements in the following preferred amounts: iron from 2.0 to 5.0 percent, optimally 3 to 4 percent; chromium 0.4 to 2.0 percent optimally 1 to 2 percent; titanium 0.4 to 2.0 percent, optimally 1 to 2 percent; zirconium 0.05 to 0.2 percent, optimally 0.1 to 0.2 percent; molybdenum 0.4 to 2.0 percent, optimally 1 to 2 percent; columbium 0.4 to 2.0 percent, optimally 1 to 2 percent; vanadium 0.4 to 2.0 percent, optimally 1 to 2 percent; and mixtures thereof.

When the alloy contains at least one additional element, the microstructure of the alloy contains a dispersion which likely consists in part of one or more intermetallic compounds which is formed between aluminum and each of the additional elements of the present invention. The metallographic grain structure of the alloys is uniformly fine with a grain size less than 0.065 mm. and generally less than 0.040 mm.

In accordance with the present invention it is preferred to use the aluminum bronze alloy containing at least one of the additional elements defined above. The additional element or elements serve to inhibit the grain growth so that a still finer grain size is attained with the additional element or elements than the excellent grain size attained with the binary alloy. This further improvement in grain size is due to the aforementioned dispersion, including the intermetallic compound or compounds, the overall effect of which is to develop even higher strength levels in the ternary alloy than is attained in accordance with the binary alloy.

The preferred aluminum content of the alloys to be joined is from 9.4 to 10.4 percent aluminum and optimally 9.8 to 10.0 percent aluminum. The additional element added should be a strong intermetallic compound former with aluminum and should in fact preferentially form intermetallic compounds with aluminum. In addition, the additional element and/or intermetallic compounds formed should preferably form a dispersion in copper with limited solid solubility at temperatures up to 1800° F. The remainder or balance of the alloy is essentially copper, that is, the alloy may contain incidental impurities or other materials which do not materially degrade the physical characteristics of the alloy. Examples of such elements which can be present include tin, zinc, lead, nickel, silicon, silver, phosphorus, magnesium, antimony, bismuth and arsenic.

In the method of preparing a high strength joined article in accordance with the present invention, the aluminum bronze alloys to be joined are provided in the temper rolled condition. The temper rolled condition is attained in accordance with the teaching of the aforesaid co-pending applications of which the present application is a continuation-in-part, i.e., the alloy having the aforesaid composition is hot worked at a temperature of from 1850° F. to 1000° F. followed by cold working at a temperature below 500° F. The hot working and cold working operations are preferably hot rolling and cold rolling, although they include forging, extrusion, drawing, swaging and cold forging, for example. The preferred hot rolling temperature is 1650° F. to 1000° F. and the preferred cold rolling temperature is 0° F. to 200° F.

Subsequent to hot rolling and prior to cold rolling the alloy contains the maximum amount of alpha phase possible, as governed by the phase equilibrium for the particular composition. The attainment of the maximum amount of alpha phase is insured by holding the alloy in the temperature range of 1050° F. to 1100° F. for at least two minutes either during or subsequent to hot rolling. This may be done, for example, by cooling the alloy slowly throughout the temperature range during the normal course of hot rolling.

Subsequent to cold rolling the alloy may be annealed at a temperature of from 1000° F. to 1400° F., preferably 1000° F. to 1100° F. and optimally 1050° F. to 1100° F. In the preferred embodiment the cold rolling and annealing steps are repeated, preferably a plurality of times with optimum results having been found at three cycles of cold rolling and annealing.

The alloy in either the temper rolled or temper rolled and annealed condition is characterized by a proportion of alpha to beta phase as follows: 5 to 95 percent beta phase and the remainder alpha.

After the alloy is provided in the temper rolled condition or, preferably, in the temper rolled and annealed condition, the brazing flux and filler metal are applied to the surfaces to be joined, an assembly formed, and the joined article prepared in the manner described above. The improved properties of the article of the present invention are attained due to the brazing operation at an elevated temperature. The article thereby joined is brazed at a temperature of, for example, 1100° F. to 1800° F., during which treatment the parent alloy thereby joined is automatically converted to a high proportion of beta phase. The subsequent rapid quenching to at least below 1000° F. at a rate greater than 300°

F. per minute develops very high strength levels in the alloy, i.e., betatizing. It is preferred to water quench at a rate of about 10,000° F. per minute, and it is preferred to rapid cool to below 800° F.

In the rapid cooling, the alloy retains a high proportion of beta phase and the beta phase undergoes a structural transformation known as a martensitic transformation which results in a significant increase in strength and results in an alloy having an excellent combination of strength and ductility. In addition, the presence of the dispersion described above provides the same advantageous effects previously referred to. The end result is an excellent brazed joint with exceptionally high strength levels in the parent metal.

The formed part, that is the alloy to be joined formed into the shape required for the given use, is preferably clean of aluminum oxides in the preferred embodiment. A brazing flux is employed, whether or not the surface of the metal is clean, with the brazing flux serving to dissolve any oxides on the surface to be joined. By the use of a filler metal and brazing flux the present invention contemplates the use of a self-fluxing filler metal. Thus in the event that a self-fluxing filler metal is employed, a separate brazing flux need not be used, but in this instance the self-fluxing filler metal serves the same purpose as the brazing flux.

The brazing flux should have a melting point lower than the melting point of the filler metal. Any conventional brazing flux known in the art to be useful on copper and aluminum alloys may be employed, i.e., a brazing flux that removes aluminum and copper oxides and exposes clean metal or metal alloy. The objective of using a brazing flux is to get clean metal surfaces so that metal to metal contact is obtained and wettability is promoted.

The manner of applying the brazing flux is not particularly critical. The brazing flux is applied to the surfaces to be joined in order to get clean metal in the manner aforesaid. Preferably the flux is applied in paste form at room temperature. The flux and filler may be applied separately or preferably the flux and filler are applied simultaneously in one operation. The filler metal would naturally be applied in some solid form and frequently in the form of a wire or a powder mixed with the paste flux.

The filler metal and the flux are applied to the surfaces of the alloy or alloys to be joined, with the alloys to be joined being preferably identical aluminum bronze alloys. Different aluminum bronze alloys may be joined in accordance with the present invention within the broad scope of the present invention defined above or different surfaces of the same aluminum bronze alloy as, for example, the preparation of heat exchange tubes from copper strip.

The fact that the present invention comprehends, within its scope, brazing at the normally elevated brazing temperatures is a surprising aspect of the present invention. In the conventional operations by brazing or thermal treatment of copper base alloys at the normally high brazing temperatures physical properties of the joining or parent metal are degraded as a result of full annealing at these brazing temperatures. That is, usually the brazing temperature of copper base alloys are over 1000° F. and thermal treatment of copper base alloys in this brazing temperature range causes significant property degradation of the alloy.

The filler metal which is employed must have a melting point lower than the melting point of the copper base alloy being brazed, i.e., lower than about 1900° F. The filler metal must have a melting point over 1049° F. and lower than the melting point of the particular aluminum bronze alloy being brazed. In the preferred embodiment the filler metal has a solidus-liquidus temperature range between 1300° F. and 1700° F. as this is the preferred temperature range within which the alloys of the present invention are betatized, i.e., automatically converted to a high proportion of beta phase. When the alloys are brazed in the temperature range of the melting point of the filler metal and subsequently rapidly cooled in accordance with the present invention, an excellent joined article is obtained and especially high strength levels are developed in the parent metal. This is a particularly surprising and a highly advantageous aspect of the present invention since the brazing temperature range to be utilized fortuitously coincides with the betatizing temperature range for these alloys, thus providing an unusual combination of circumstances for the development of an unusually high strength article.

Any filler metal may be employed within the foregoing limitations, with the further limitation that the filler must melt above 1049° F. since this is the eutectoid transformation temperature for these copper base alloys. The filler metal should have fluidity at the brazing temperature and should not ball or bunch up, but should spread or wet the surface of the parent metal. Further, any brazing flux may be employed provided it melts below the melting point of the filler metal and dissolves aluminum oxides and copper oxides. For example, the brazing flux may contain a mixture of metallic halides for dissolving the aluminum oxides and boron oxide and its compounds for dissolving copper oxides, e.g., chlorides of sodium, potassium, zinc, lithium and aluminum; lithium fluoride; boron oxide; potassium borate; and sodium borate.

Representative filler metals include but are not limited to: silver brazing alloys containing silver, copper and zinc in various proportions and in some cases containing additions, such as cadmium, phosphous and tin, e.g., an alloy containing about 50 percent silver, 16 percent copper, 16 percent zinc, 18 percent cadmium and melting at 1175° F.; an alloy containing 15 percent silver, 80 percent copper, 5 percent phosphorus and melting at 1300° F.; and an alloy containing 56 percent silver, 22 percent copper, 17 percent zinc and 5 percent tin and melting at 1700° F. Other filler metals include phos-coppers, i.e., copper base alloys containing from 5 and 7 percent phosphorus and melting from 1350–1450° F. Others include copper-zinc brazing alloys, e.g., an alloy containing 52 percent copper and 48 percent zinc and melting at 1600° F.; and an alloy containing 52 percent copper, 45 percent zinc and 3 percent tin and melting at 1620° F.

The brazing operation is performed in the conventional manner. That is, an assembly is formed by placing the surfaces to be joined with interposed filler metal and brazing flux into intimate contacting relationship and the assembly is heated to a temperature above the melting point of the filler metal but below the melting point of the alloys to be joined. After the heating step, the assembly is rapidly cooled in the manner defined above to provide the exceptionally high strength article of the present invention.

In accordance with the present invention still greater improvement in properties may be readily obtained by subsequent processing steps. For example, the joined article may be tempered following brazing and rapid cooling, i.e., betatizing steps. This tempering procedure results in still better strength for the parent metal principally yield strength. It is accomplished by holding the joined article for at least 20 minutes at a temperature of from 500° F. to 900° F. and preferably from 600° F. to 700° F.

This tempering may be accomplished either by a special subsequent heat treatment step or by an additional joining, for example, soldering which is carried out within the tempering range.

*Example I*

Alloys containing 9.8 percent aluminum, 4 percent iron and the balance essentially copper were made from a charge of cathode copper and commercial purity aluminum in the form of 1¾" x 1¾" x 4½" chill castings.

The alloys were hot rolled in the temperature range of from 1600° F. to 1300° F. Reductions of about 10 to 20 percent per pass were used in reducing the gage from 1.75" to 0.1". These reductions were limited primarily by the roll diameter. Following hot rolling, the alloys were held at 1100° F. for 30 minutes and subsequently air cooled for maximum cold rollability.

Cold rolling of the alloy 42 percent resulted in alloys having a yield strength of 114,000 p.s.i., a tensile strength of 151,000 p.s.i. with a corresponding decrease in elongation to 2.5 percent. The alloys had a uniformly fine metallographic grain structure with a grain size less than 0.065 mm. in diameter and contained a proportion of alpha to beta phase within the range of the present invention.

The resultant alloy was in the temper rolled condition.

Example II

The microstructures of the alloys, after the treatments of Example I, were further refined by cold rolling in three steps with intermediate annealing at 1100° F. after each cold roll. The gage was reduced from 0.100" to 0.050". As a result of this cold rolling with inter anneals at 1100° F., grain sizes of about 0.020 mm. in diameter were obtained with a proportion of alpha to beta phase within the range of the present invention. The resultant alloys were in the temper roled and annealed condition.

Example III

Specimens of the alloys prepared in accordance with Examples I and II were provided in the shape of blanks 1" x 5" x 0.04" in shape. In the following examples, the brazing filler used was filler-1, a mixture of 93 percent copper and 7 percent phosphorus having a melting point of about 1350° F. The brazing flux used had the following composition

| | Percent |
|---|---|
| $KBO_2$ | 33 |
| KCl | 28 |
| LiCl | 7 |
| $3ZnO \cdot 2B_2O_3$ | 5 |
| $AlCl_3$ | 4 |
| $H_2O$ | Balance |

The blanks were cut to size, degreased with methyl ethyl ketone, pickled in a hot aqueous solution containing sulfuric acid and potassium dichromate and dry abraded with coarse steel wool. The blanks were set into a fixture and held in overlapping relationship. Prior to setting into the fixture, the above brazing flux was brushed on the surfaces to be brazed and the filler metal applied. All specimens were placed in an electric furnace set at 1850° F. The specimens were kept in the furnace for 15 seconds and 55 seconds after the filler metal was observed to flow. When removed from the furnace, the specimens were rapidly cooled to ambient temperature with compressed air, with the cooling rate being in excess of 300° F. per minute to below 800° F., and then allowed to cool under ambient conditions to room temperature.

Finished single-lap shear specimens were prepared from the brazed blanks by machining the center portion in accordance with conventional procedure to a width of ½" at the joint over a four inch gage length.

The specimens were pulled in tension causing the lap joint to fail in shear. The results are shown below:

TABLE I.—STRENGTH OF BRAZED JOINTS IN FURNACE FOR 15 SECONDS AFTER FILLER MELTED

| Overlap, inches | Load at Failure, lbs. | Shear Stress in Joint at Failure, p.s.i. | Tensile Stress in Joint at Failure, p.s.i. | Location of Failure |
|---|---|---|---|---|
| 4/64 | 750 | 24,000 | 37,500 | Joint. |
| 10/64 | 1,825 | 23,390 | 91,250 | Do. |
| 18/64 | 2,050 | 14,580 | 102,500 | Metal. |
| 28/64 | 2,010 | 7,150 | 100,500 | Do. |
| 34/64 | 2,040 | 7,690 | 102,000 | Do. |
| 43/64 | 2,000 | 5,950 | 100,000 | Do. |
| 53/64 | 2,000 | 4,830 | 100,000 | Do. |
| 64/64 | 2,060 | 4,120 | 103,000 | Do. |

TABLE II.—STRENGTH OF BRAZED JOINTS IN FURNACE FOR 55 SECONDS AFTER FILLER MELTED

| Overlap, inches | Load at Failure, lbs. | Shear Stress in Joint at Failure, p.s.i. | Tensile Stress in Joint at Failure, p.s.i. | Location of Failure |
|---|---|---|---|---|
| 12/64 | 1,500 | 16,000 | 75,000 | Joint. |
| 20/64 | 1,705 | 10,900 | 85,250 | Do. |
| 27/64 | 2,050 | 9,730 | 102,500 | Metal. |
| 37/64 | 2,030 | 7,030 | 101,500 | Do. |
| 42/64 | 1,960 | 5,975 | 98,000 | Do. |
| 53/64 | 1,940 | 4,680 | 97,000 | Do. |
| 62/64 | 1,980 | 4,090 | 99,000 | Do. |

The brazed joint was examined and found to have the following characteristics: about 30 percent beta and 70 percent alpha; a uniformly fine grain size, even at the area of the braze, with a grain size of about 0.030 mm.; and with no apparent penetration of the filler metal into the base alloy.

Example IV

Comparative examples were run with both tough pitch copper and 70–30 brass using both filler-1 above and filler-2 which is an alloy containing 50 percent silver, 16 percent copper, 16 percent zinc, 18 percent cadmium and melting at 1175° F. The samples were treated in the same manner as Example III with the specimens removed from the furnace as soon as the filler metal was completely liquid and flowed between adjoining surfaces. The tensile strength of the resultant joints are as follows:

TABLE III

| Base Metal | Filler | Overlap distance, inches | Location of Failure | Tensile Strength, p.s.i. | Grain size, mm. |
|---|---|---|---|---|---|
| Tough pitch copper | Filler-1 | 3/64 | Metal | 31,000 | 0.045 |
| Do | Filler-2 | 3/64 | do | 31,000 | 0.036 |
| 70–30 Brass | Filler-1 | 4.5/64 | do | 42,000 | 0.300 |
| Do | Filler-2 | 5/64 | do | 46,000 | 0.100 |

For each base metal, smaller overlaps cause failure to occur in the joint rather than the base metal.

The brazed joints were examined and found to have the following characteristics: both base metals were all alpha phase; the 70–30 brass had a coarse grain size; both base metals showed appreciable penetration of filler metal into the base alloy greater than several grain diameters.

This invention may be embodied in other forms or carried out in other ways without departing from the spirit or essential characteristics thereof. The present embodiment is therefore to be considered as in all respects illustrative and not restrictive, the scope of the invention being indicated by the appended claims, and all changes which come within the meaning and range of equivalency are intended to be embraced therein.

What is claimed is:
1. A high strength joined article comprising at least two faying surfaces of aluminum bronze alloys containing from 9.0 to 11.8 percent aluminum and the balance essentially copper, said alloys having a metallographic structure containing from 5 to 95 percent beta phase, wherein the beta phase has a martensitic structure and the remainder alpha phase and having uniformly fine metallographic grain structure with a grain size less than 0.065 mm., said faying surfaces being joined together by filler metal having a melting point lower than the aluminum bronze alloys but above 1049° F., wherein interdiffusion of said filler metal into said aluminum bronze alloy is less than one grain diameter, said joined article having a tensile strength in excess of 100,000 p.s.i.

2. A joined article according to claim 1 wherein said aluminum bronze alloy contains from 9.0 to 11.8 percent aluminum, from 0.05 to 5.0 percent of at least one additional element having a solid solubility in copper of less than 4.0 percent and which forms at least one intermetallic compound with aluminum, the total quantity of said additional elements being less than 10 percent, and the balance essentially copper.

3. A joined article according to claim 2 wherein said additional element is selected from the group consisting of the following elements in the following amounts: iron from 2.0 to 5.0 percent; chromium from 0.4 to 2.0 percent; titanium from 0.4 to 2.0 percent; zirconium from 0.05 to 0.2 percent; molybdenum from 0.4 to 2.0 percent; columbium from 0.4 to 2.0 percent; vanadium from 0.4 to 2.0 percent; and mixtures thereof.

4. A joined article according to claim 1 wherein said aluminum bronze alloy contains from 9.4 to 10.4 percent aluminum.

5. A joined article according to claim 1 wherein said aluminum bronze alloy contains from 9.8 to 10.0 percent aluminum.

6. A joined article according to claim 1 wherein said grain size is less than 0.040 mm.

7. A joined article according to claim 1 wherein said filler metal has a solidus-liquidus temperature range between 1300° F. and 1700° F.

References Cited
UNITED STATES PATENTS

| | | | |
|---|---|---|---|
| 2,829,968 | 4/1958 | Klement | 75—162 |
| 2,870,051 | 1/1959 | Klement | 75—162 X |
| 3,163,499 | 12/1964 | Bray | 29—199 |
| 3,176,410 | 4/1965 | Klement | 75—162 X |

HYLAND BIZOT, *Primary Examiner.*